United States Patent
Sung

(10) Patent No.: US 9,296,580 B2
(45) Date of Patent: Mar. 29, 2016

(54) AUTO DOCUMENT FEEDER, SCANNER INCLUDING THE SAME, AND METHOD OF CONTROLLING AUTO DOCUMENT FEEDING

(71) Applicant: Samsung Electronics Co., Ltd., Suwon-si (KR)

(72) Inventor: Byung-jun Sung, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/330,162

(22) Filed: Jul. 14, 2014

(65) Prior Publication Data

US 2015/0014914 A1    Jan. 15, 2015

(30) Foreign Application Priority Data

Jul. 12, 2013    (KR) .................. 10-2013-0082466

(51) Int. Cl.
| | |
|---|---|
| B65H 7/06 | (2006.01) |
| B65H 7/18 | (2006.01) |
| H04N 1/00 | (2006.01) |
| B65H 7/14 | (2006.01) |
| B65H 7/20 | (2006.01) |

(52) U.S. Cl.
CPC .. B65H 7/06 (2013.01); B65H 7/14 (2013.01); B65H 7/20 (2013.01); H04N 1/00652 (2013.01)

(58) Field of Classification Search
CPC .............. B65H 7/06; B65H 7/18; B65H 7/02; B65H 7/20; B65H 2511/514; B65H 2513/10; H04N 1/0057; H04N 1/00745; H04N 1/00774; H04N 1/00779; H04N 1/00793; H04N 1/00785
See application file for complete search history.

(56) References Cited

U.S. PATENT DOCUMENTS

| | | | | |
|---|---|---|---|---|
| 3,737,158 | A | | 6/1973 | Beery et al. |
| 5,299,795 | A | * | 4/1994 | Miyake ................. 271/9.02 |
| 6,135,439 | A | * | 10/2000 | Ikeda ................... 271/10.03 |

(Continued)

FOREIGN PATENT DOCUMENTS

| | | | | |
|---|---|---|---|---|
| JP | 07277553 | A | * | 10/1995 |
| JP | 2001253572 | A | * | 9/2001 |
| JP | 2003312867 | A | * | 11/2003 |
| JP | 2005-094604 | | | 4/2005 |
| JP | 2006-131313 | | | 5/2006 |

OTHER PUBLICATIONS

Extended European Search Report dated Feb. 16, 2015 in European Patent Application No. 14176784.8.

(Continued)

*Primary Examiner* — Luis A Gonzalez
(74) *Attorney, Agent, or Firm* — Staas & Halsey LLP

(57) ABSTRACT

Provided are an auto document feeder (ADF), a scanner including the ADF, and a method of controlling auto document feeding. The ADF includes: a feed unit picking up a sheet of paper and carrying the sheet of paper to a scan unit; a feed control unit controlling the feed unit; and a retry control unit. If a sheet of paper is not normally picked up by the feed unit, the retry control unit decreases a speed of a motor driving the feed unit or increases a current supplied to the motor for picking up the sheet of paper. Therefore, although sheets of paper are not normally fed when a user intends to use various kinds of sheets of paper with the ADF, the retry control unit may stabilize feeding of the feeding of the sheets of paper. Thus, efficient, convenient, and high-quality paper feeding may be possible.

20 Claims, 11 Drawing Sheets

(56) References Cited

U.S. PATENT DOCUMENTS

| | | | |
|---|---|---|---|
| 6,381,441 B1 | 4/2002 | Byeon et al. | |
| 7,523,932 B2* | 4/2009 | Morisaki et al. | 271/270 |
| 7,748,694 B2* | 7/2010 | Matsumoto | 271/10.03 |
| 8,861,050 B2* | 10/2014 | Sahara | 358/498 |
| 2004/0217541 A1 | 11/2004 | Horio | |
| 2013/0083374 A1* | 4/2013 | Nagai | 358/488 |

OTHER PUBLICATIONS

English Abstract and Machine Translation of Japanese Reference 2001-253572, which was cited in the US Office Action issued Jan. 16, 2015 in U.S. Appl. No. 14/330,162.

* cited by examiner

AUTO DOCUMENT FEEDER, SCANNER INCLUDING THE SAME, AND METHOD OF CONTROLLING AUTO DOCUMENT FEEDING

CROSS-REFERENCE TO RELATED APPLICATIONS

This application claims the priority benefit of Korean Patent Application No. 10-2013-0082466, filed on Jul. 12, 2013, in the Korean Intellectual Property Office, the disclosure of which is incorporated herein in its entirety by reference.

BACKGROUND

1. Field

One or more embodiments relate to a medium feeder such as a paper feeder, and particularly, to a stable auto document feeder (ADF) capable of normally and stably picking up various kinds of print medium such as various kinds of sheets of paper, and a scanner including the ADF and a method of controlling auto document feeding.

2. Description of the Related Art

Auto document feeders (ADFs) are used to control picking up and feeding of sheets of paper and scanning of images of the sheets of paper. FIG. 1 is a view illustrating a paper feed operation of an ADF. Referring to FIG. 1, after a sheet of paper is picked up and carried a predetermined distance, a sensor 120 placed along an ADF path generates a turn-on signal, and the next operation is performed.

First, as shown in FIG. 1, a pickup mechanism is moved to a position 100 adjacent to a paper side for starting a paper pickup operation. After the paper pickup operation, the pickup mechanism is moved back to a position 110 as shown in FIG. 1. In addition, if the paper pickup operation is repeated, the pickup mechanism is moved away from the paper side.

If the sensor 120 does not generate a turn-on signal, the paper pickup operation is repeated, and if the number of repetition times is equal to or greater than a maximum number of times, an error message is displayed.

FIG. 1 also shows feed rollers 130, scan rollers 140, exit rollers 150, sheets 160, and sheets 170.

FIG. 2 is a block diagram illustrating a paper control unit of an ADF. The paper control unit includes a feed control unit 200 and a scan control unit 250. Referring to FIG. 2, when paper feeding is normally performed, the feed control unit 200 controls the paper feeding, and then the scan control unit 250 controls image scanning. Before the feed control unit 200 controls paper feeding, the speed of a motor may be increased or decreased, and a current supplied to the motor may be controlled.

If paper feeding is not normally performed, a paper feed operation of the feed control unit 200 may be repeated to normally feed a sheet of paper. If a sheet of paper is not normally fed although the paper feed operation is repeated, an error message is displayed.

FIG. 3 is a graph illustrating how the speed of a paper feed motor is controlled. FIG. 4 is a graph illustrating how a current to the paper feed motor is controlled. Referring to FIGS. 3 and 4, if a sheet of paper is not normally picked up, a feed control unit repeats a paper feed operation while keeping the speed of the motor at a constant level and supplying a constant current to the motor.

For example, when a user intends to read images of various kinds of sheets of paper (documents) by scanning the sheets of paper using a paper feeder of an ADF, paper feeding may not be normally performed due to the variety of types of sheets of paper. Then, the paper feeding may be repeatedly performed, and if a sheet of paper is not normally picked up although the paper feeding is performed a maximum number of times, an error message may be displayed. If a sheet of paper is not normally picked up although the paper is performed a maximum number of times, sheets of paper (documents) may not be conveniently scanned and read.

SUMMARY

One or more embodiments include a stable auto document feeder (ADF) for normally and stably picking up various kinds of sheets of paper.

One or more embodiments include a method of controlling paper feeding of an ADF for normally and stably picking up various kinds of sheets of paper.

One or more embodiments include a scanner including an ADF.

One or more embodiments include an image forming apparatus including an ADF.

In an aspect of one or embodiments, there is provided an ADF which includes: a feeder configured to pick up a sheet of paper and carry the sheet of paper to a scanner; a feed controller configured to control the feeder; and a retry controller, wherein if the sheet of paper is not normally picked up by the feeder, the retry controller decreases a speed of a motor driving the feeder or increases a current supplied to the motor for picking up the sheet of paper.

The retry controller may include: a motor current controller configured to vary the current supplied to the motor driving the feeder, wherein if the sheet of paper is not normally picked up by the feeder, the motor current controller may increase the current supplied to the motor; a motor speed controller configured to maintain or vary the speed of the motor, wherein if the sheet of paper is not normally picked up by the feeder, the motor speed controller may decrease the speed of the motor; and a paper distance controller, wherein a paper distance is defined as a distance between a first sensor indicating whether the sheet of paper is normally picked up and a second sensor indicating a start of image scanning, and if the sheet of paper is within the paper distance, the paper distance controller may reduce a current increased and supplied to the motor to a first original value and may increase a decreased speed of the motor to a second original value.

The feeder may include: a pickup roller configured to pick up the sheet of paper; a first sensor indicating whether the sheet of paper is normally picked up; and a feed roller configured to carry the sheet of paper passing the first sensor to the scanner.

In an aspect of one or embodiments, there is provided a scanning apparatus which includes: a scanner configured to scan an image of a sheet of paper; a scan controller configured to control an image scanning operation of the scanner; a feeder configured to pick up a sheet of paper and carry the sheet of paper to the scanner; and a feed controller may be configured to control the feeder; and a retry controller, wherein if the sheet of paper is not normally picked up by the feeder, the retry controller decreases a speed of a motor driving the feeder or increases a current supplied to the motor for picking up the sheet of paper.

The scanning apparatus may include: a scan roller configured to carry a picked-up and carried sheet of paper for a scanning process; a second sensor configured to detect a sheet of paper carried by the scan roller and indicate a start of image scanning upon detection of the sheet of paper; and an exit roller configured to discharge a sheet of paper passing the second sensor.

The motor may include: a first motor configured to drive the feeder; and a second motor configured to drive the scan unit.

In an aspect of one or more embodiments, there is provided an image forming apparatus which may include: an image forming unit configured to form an image on a sheet of paper; an image forming controller configured to control an image forming operation of the image forming unit; a feeder configured to pick up a sheet of paper and carry the sheet of paper to the image forming unit; a feed controller configured to control the feeder; and a retry controller, wherein if the sheet of paper is not normally picked up by the feeder, the retry controller decreases a speed of a motor driving the feeder or increases a current supplied to the motor for picking up the sheet of paper.

In an aspect of one or more embodiments, there is provided a method of controlling paper feeding in an automatic document feeder (ADF), which includes picking up a sheet of paper; checking whether the sheet of paper is normally picked up; and if the sheet of paper is not normally picked up, retrying to pick up the sheet of paper by decreasing a speed of a motor driving a feeder or increasing a current supplied to the motor.

The checking may be performed by detecting the sheet of paper using a first sensor.

If the sheet of paper is within a paper distance defined from a first sensor indicating whether the sheet of paper is normally picked up to a second sensor indicating a start of image scanning, the method may further include reducing the increased current supplied to the motor to an original value and increasing the decreased speed of the motor to an original value.

If the sheet of paper is not normally picked up, the picking up and the checking may be performed, and if the picking up and the checking are performed more than a preset number of times, the retrying may be performed.

If the sheet of paper is not normally picked up, the retrying may be repeated, and if the retrying is performed more than a preset number of times, a paper feed error may be displayed.

In an aspect of one or more embodiments, there is provided an ADF (auto document feeder) including a feeder configured to pick up a sheet of a medium and carry the sheet to a scanner; and a retry controller, wherein if the sheet is not normally picked up by the feeder, the retry controller decreases a speed of a motor driving the feeder or increases a current supplied to the motor for picking up the sheet.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
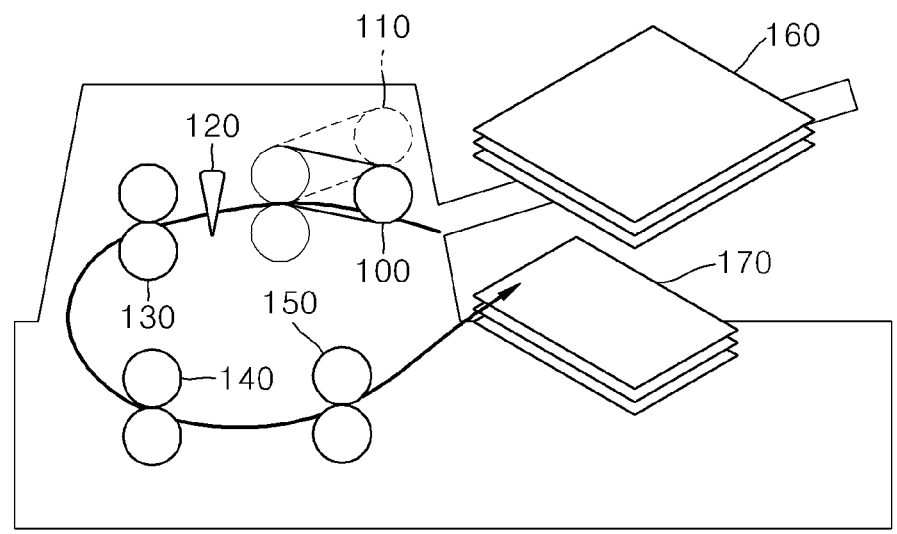
FIG. 1 is a view illustrating a paper feed operation of an auto document feeder (ADF)
Figure 2:
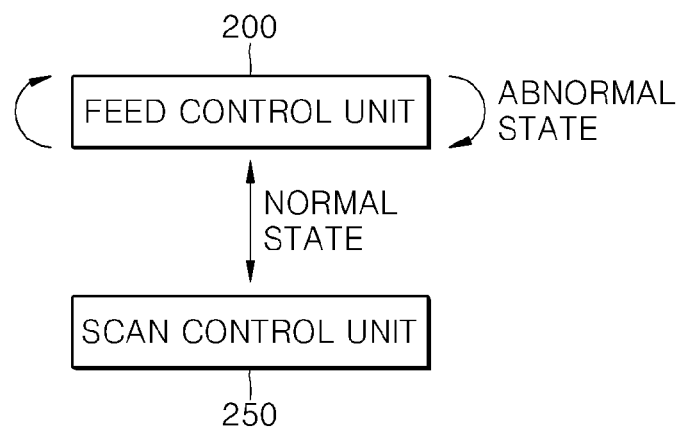
FIG. 2 is a block diagram illustrating a paper control unit of an ADF.
Figure 3:
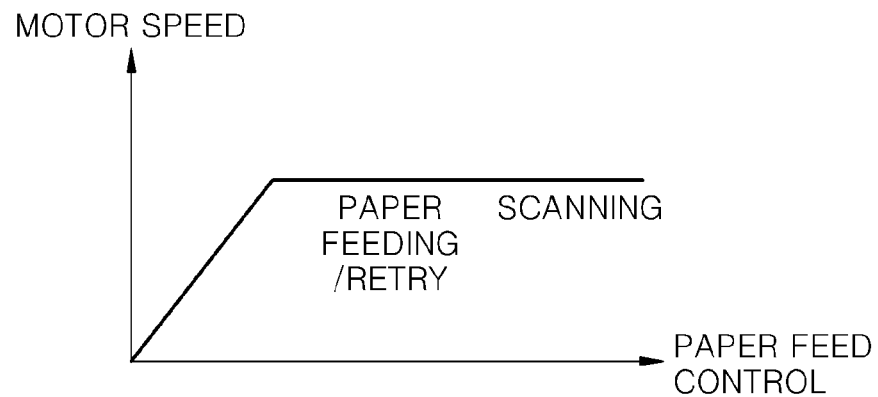
FIG. 3 is a graph illustrating how the speed of a paper feed motor is controlled.
Figure 4:
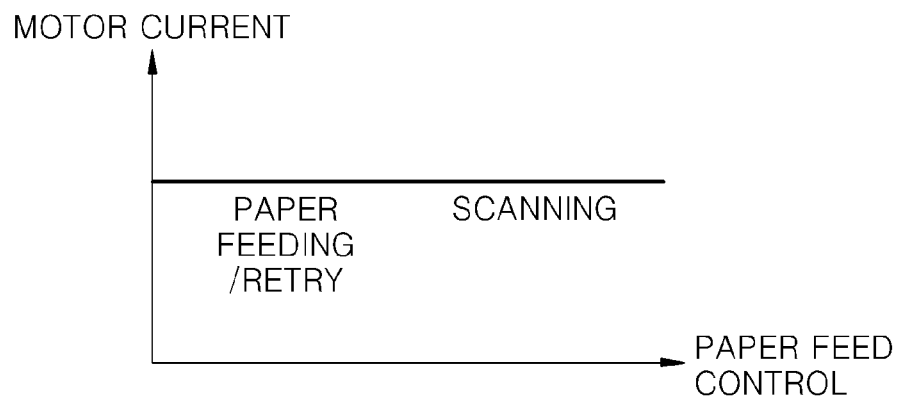
FIG. 4 is a graph illustrating how a current supplied to the paper feed motor is controlled.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the present disclosure. As used herein, the term "and/or" includes any and all combinations of one or more of the associated listed items.

Although the term "paper" is used in embodiments, "paper" is an example of a medium which may contain an image to be scanned. The term "paper" is intended as an example and other mediums upon are also contemplated.

Figure 5:
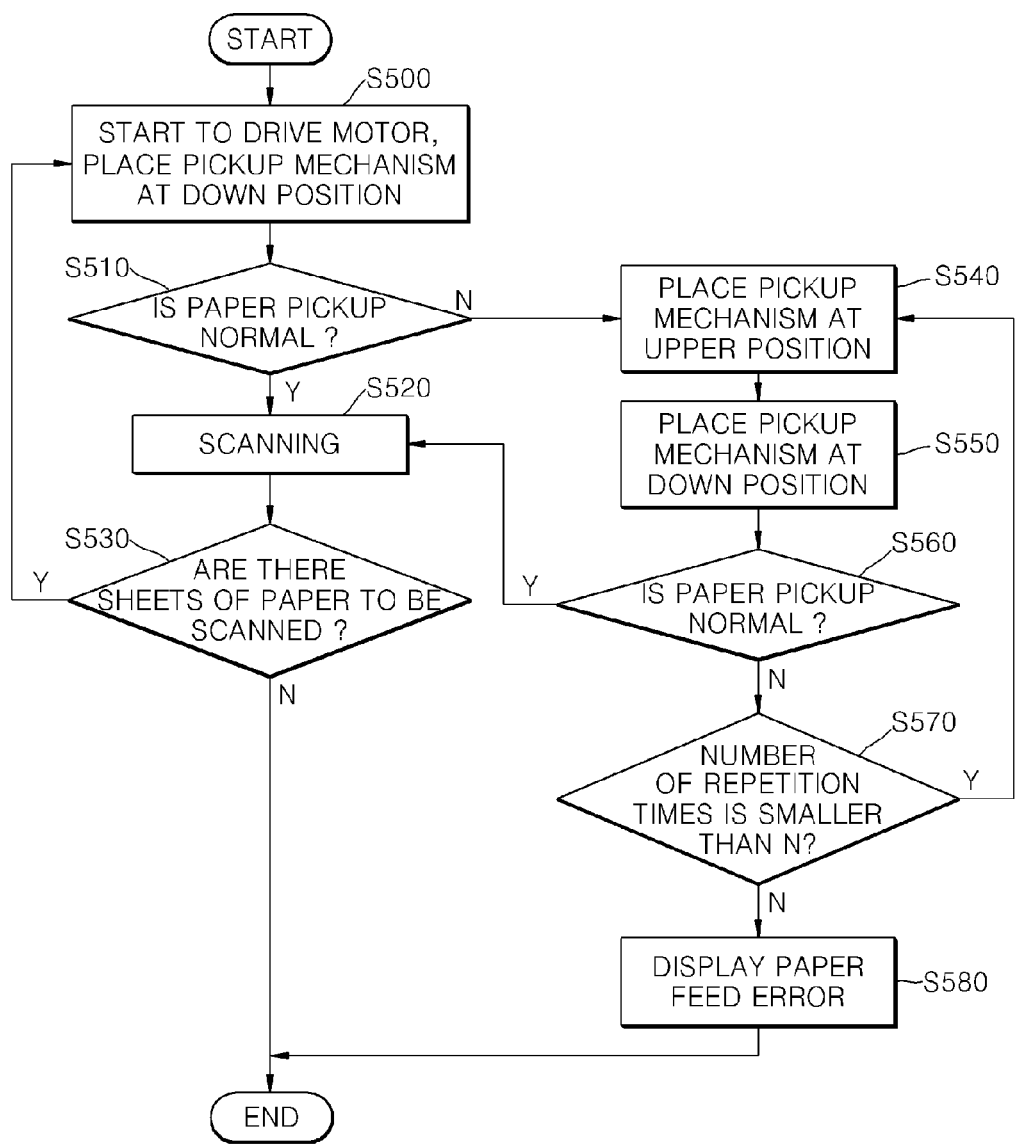
FIG. 5 is a flowchart illustrating a general method of controlling paper feed operations of an ADF.

FIG. 5 is a flowchart illustrating a general method of controlling paper feed operations of an auto document feeder (ADF). A normal paper feed operation, repetition of a paper feed operation in an abnormal state, and an image scanning control operation are illustrated.

Referring to FIG. 5, if paper feeding starts, a motor is operated, and a pickup mechanism is placed at a down position (refer to the position 100 in FIG. 1) (operation S500). Then, it is checked whether a sheet of paper is normally picked up by detecting the sheet of paper using a sensor such as the sensor 120 shown in FIG. 1 (operation S510).

If it is determined that the sheet of paper is normally detected, a scan control unit (scan controller) such as the scan control unit 250 (scan controller) shown in FIG. 1 is operated to scan an image (operation S520). However, if it is determined that the sheet of paper is not normally picked up based on a detection result of the sensor 120, the pickup mechanism is placed at an upper position (operation S540), and is then placed at the down position to pick up the sheet of paper (operation S550). Thereafter, it is checked whether the sheet of paper is normally picked up by using the sensor 120 (operation S560). If it is determined that the sheet of paper is normally picked up, the scan control unit 250 is operated to scan an image, and if it is determined that the sheet of paper is not normally picked up, operations S540 to S560 are repeated a preset maximum number of times N (operation S570). If the sheet of paper is not picked up after operations S540 to S560 are repeated the present maximum number of times N (operation S570), a paper feed error is displayed (operation S580), and the paper feeding by the ADF is stopped.

If the sheet of paper is normally picked up, the scan control unit 250 scans an image of the sheet of paper, and it is checked whether there remain sheets of paper to be scanned (operation S530). If it is determined that there remain sheets of paper to be scanned, operation S500 is performed. After all sheets of paper are scanned in this way, the paper feeding by the ADF is stopped.

Figure 10A:
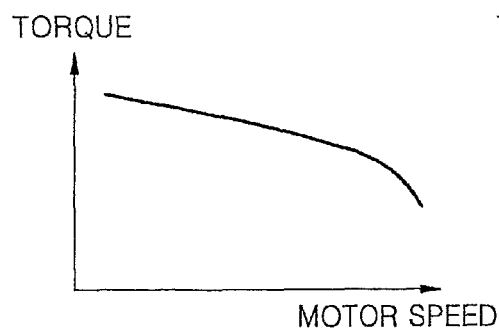
FIGS. 10A and 10B are graphs illustrating general characteristics of a step motor used to drive an ADF.
Figure 10B:
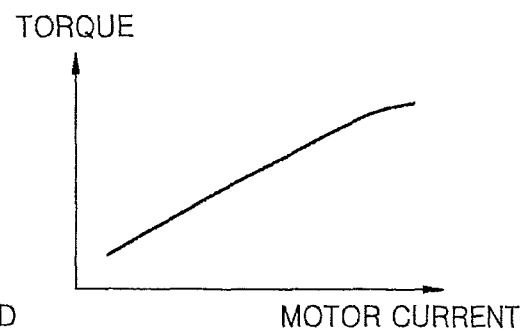

FIGS. 10A and 10B are graphs illustrating general characteristics of a step motor used to drive an ADF. FIG. 10A is a graph illustrating a relationship between torque and speed of the step motor. In a constant current condition, the torque of the step motor decreases as the speed of the step motor increases. That is, as the speed of the step motor decreases, the torque of the step motor increases. FIG. 10B is a graph illustrating a relationship between torque and current of the step motor. In a constant speed condition, the torque of the step motor increases in proportion to a current supplied to the step motor. That is, if a current to the step motor is decreased, the torque of the step motor is also decreased. Although a current to the step motor is increased, there is an upper limit of torque according to characteristics of the type of the step motor. In one or more embodiments, such torque-current or torque-speed characteristics of a motor are used for stably controlling paper feeding.

For example, a motor having a speed range of about 400 Hz to about 3000 Hz and a current range of about 0.7 A to about 1.4 A (ampere) may be used in one or more embodiments. Specifically, for example, a 1.0-A, 2700-Hz, 124-mNm (milli Newton meter) motor may be used.

Table 1 shows a proportional relationship between torque and current and an inverse-proportional relationship between torque and speed. In Table 1, P7WS and K65WS denote motor types, P.out denotes pull-out torque of a motor measured during operation, and P.in denotes pull-in torque of a motor measured while operating the motor starts from a non-operating state.

TABLE 1

| | 1.3 A | | | | 0.7 A | | | | 0.3 A | | | |
|---|---|---|---|---|---|---|---|---|---|---|---|---|
| | P7WS | | K65WS | | P7WS | | K65WS | | P7WS | | K65WS | |
| | P. out | P. in | P. out | P. in | P. out | P. in | P. out | P. in | P. out | P. in | P. out | P. in |
| 200 | 234.5 | 204.0 | 204.0 | 191.2 | 108.9 | 102.0 | 104.9 | 92.2 | 38.2 | 30.4 | 32.4 | 25.5 |
| 400 | 235.2 | 195.5 | 202.0 | 182.4 | 110.0 | 83.4 | 102.0 | 68.6 | 36.3 | | 30.4 | |
| 600 | 235.4 | 164.8 | 203.0 | 136.3 | 113.8 | | 104.0 | | 35.1 | | 33.3 | |
| 800 | 230.5 | 77.5 | 205.0 | | 112.8 | | 104.0 | | 33.3 | | 29.4 | |
| 1000 | 224.6 | | 198.1 | | 111.8 | | 100.0 | | 30.4 | | 26.5 | |
| 1500 | 214.8 | | 190.2 | | 106.9 | | 97.1 | | 27.5 | | | |
| 2000 | 195.2 | | 169.7 | | 101.0 | | 94.1 | | 24.5 | | | |
| 2733 | 162.0 | | 150.8 | | 96.1 | | 88.3 | | | | | |
| 3000 | 152.0 | | 142.3 | | 89.6 | | 86.3 | | | | | |
| Hz | | | | | | | | | | | | mNm |

Figure 6:
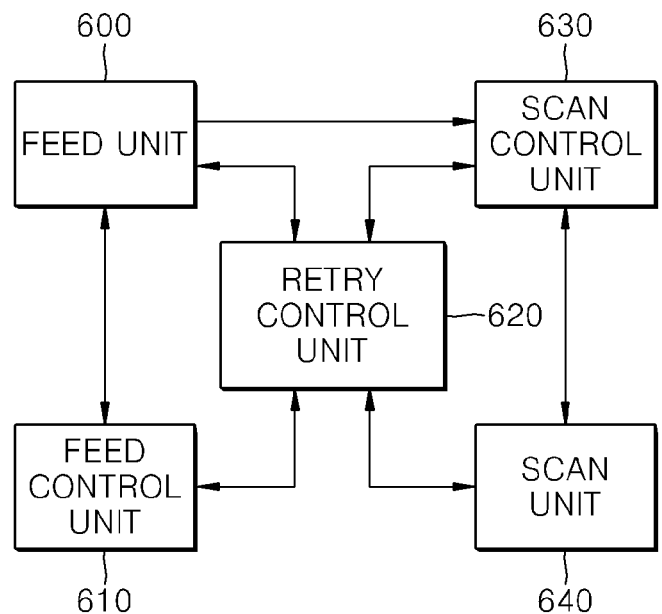
FIG. 6 is a block diagram illustrating a scanner including an ADF according to an embodiment.

FIG. 6 is a block diagram illustrating a scanner including an ADF according to an embodiment.

Figure 7:
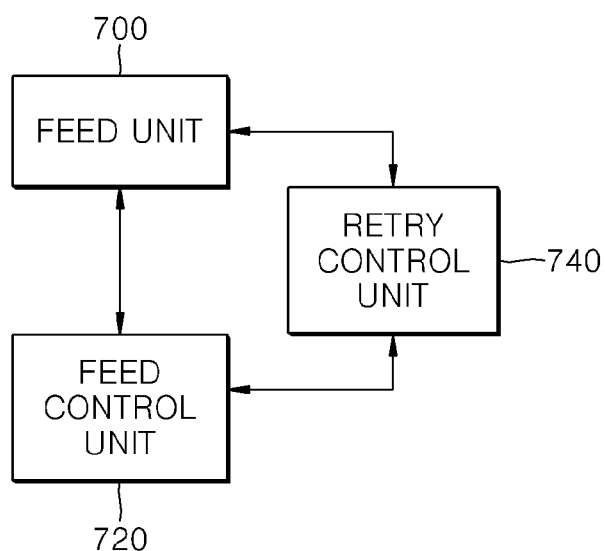
FIG. 7 is a block diagram illustrating an ADF according to an embodiment.

FIG. 7 is a is a block diagram illustrating an ADF including a feed unit (feeder) 700, a feed control unit (feed controller) 720, and a retry control unit (retry controller) 740 according to an embodiment.

Figure 8:
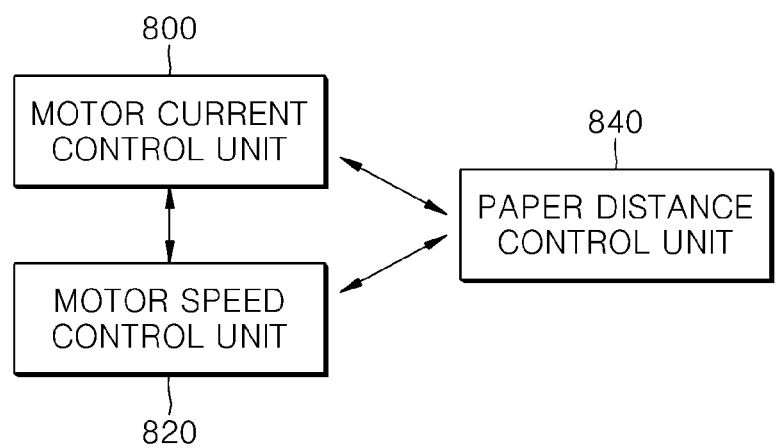
FIG. 8 is a block diagram illustrating a retry control unit according to an embodiment.

FIG. 8 is a block diagram illustrating the retry control unit 740 according to an embodiment. The retry control unit 740 includes a motor current control unit (motor current controller) 800, a motor speed control unit (motor speed controller) 820, and a paper distance control unit (paper distance controller) 840.

Figure 9:
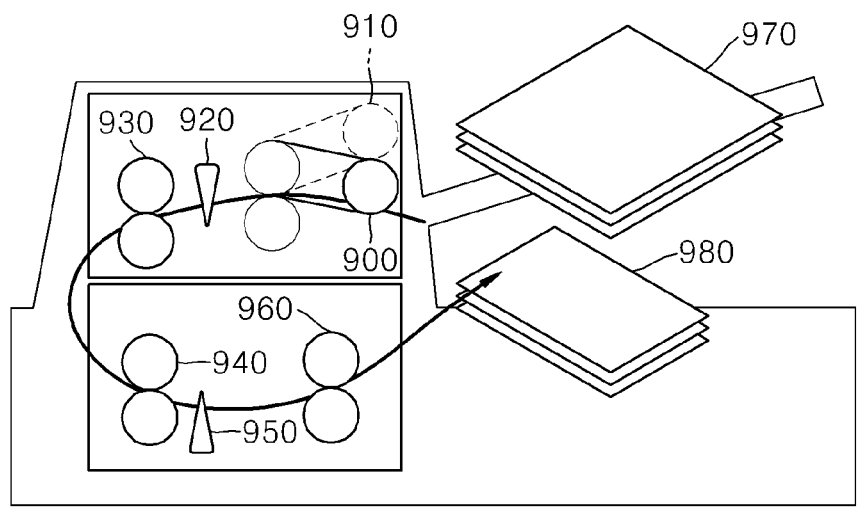
FIG. 9 is a view illustrating a scanner including an ADF according to an embodiment.

FIG. 9 is a view illustrating the scanner including the ADF according to an embodiment.

With reference to FIGS. 6 to 9, the ADF and the scanner including the ADF will now be described according to one or more embodiments.

First, the ADF will now be described with reference to FIGS. 6 to 9 according to one or more embodiments. The feed unit 700 picks up a sheet of paper and carries the sheet of paper to a scan unit (scanner) 640. The feed unit 700 may include a pickup roller (900, 910), a first sensor 920, and feed rollers 930.

The pickup roller (900, 910) picks up a sheet of paper 970 on which an image to be scanned is formed. The first sensor 920 detects a picked-up sheet of paper and indicates whether the sheet of paper is normally detected. The first sensor 920 may a registration sensor. The feed rollers 930 carry a sheet of paper passing the first sensor 920. Registration rollers may be used instead of the feed rollers 930.

The feed control unit 720 controls the feed unit 700. Specifically, the feed control unit 720 controls the pickup roller (900, 910) so that the feed unit 700 may pick up a sheet of paper.

If a sheet of paper is not normally picked up by the feed unit 700, the retry control unit 740 decreases the speed of a motor driving the feed unit 700 or increases a current supplied to the motor for picking up the sheet of paper. Whether a sheet of paper is normally picked up may be determined based on whether the first sensor 920 detects the sheet of paper. If the first sensor 920 detects a sheet of paper, it may be determined that the sheet of paper is normally picked up. If the speed of the motor is decreased and a current supplied to the motor is increased for picking up a sheet of paper, the retry control unit 740 changes the decreased speed of the motor and the increased current supplied to the motor to original values thereof after the sheet of paper is normally picked up and before the scan unit 640 scans an image of the sheet of paper. The reason for this is to match the speed of image scanning with the speed of paper feeding for appropriate image scanning. In addition, if a large current is applied to the motor, the scan unit 640 may be vibrated, and thus image scanning may be affected by the vibration. Therefore, the increased current supplied to the motor may be decreased to an original value thereof. The retry control unit 740 may only decrease the speed of the motor or increase a current supplied to the motor, or may control both the motor speed and current.

FIG. 8 is a block diagram illustrating the retry control unit 740 according to an embodiment. The retry control unit 740 includes the motor current control unit 800, the motor speed control unit 820, and the paper distance control unit 840.

The motor current control unit 800 varies a current supplied to the motor driving the feed unit 700. If a sheet of paper is not normally picked up by the feed unit 700, the motor current control unit 800 increases a current supplied to the motor. The motor current control unit 800 may control a current supplied to the motor both in operation and non-operation states of the motor. The motor may be a step motor.

The motor speed control unit 820 maintains or varies the speed of the motor, and if a sheet of paper is not normally picked up by the feed unit 700, the motor speed control unit 820 decreases the speed of the motor. The motor speed control unit 820 may increase the speed of the motor from a non-operation state. In addition, the motor speed control unit 820 may vary the speed of the motor while the motor is operated.

A paper distance may be defined as a distance between the first sensor 920 indicating whether a sheet of paper is normally picked up and a second sensor 950 indicating a start of image scanning, and if a sheet of paper is within the paper distance, the paper distance control unit 840 may reduce a current increased and supplied to the motor to an original value and may increase a decreased speed of the motor to an original value thereof. If a sheet of paper is picked up through a retry pickup operation in which the speed of the motor is decreased and a current supplied to the motor is increased, the paper distance control unit 840 increases the speed of the motor to an original speed suitable for image scanning after the first sensor 920 is turned on but before the second sensor 950 indicating a start of image scanning is turned on. If image scanning is performed without adjusting the speed of the motor to an original speed for image forming, since the speed of scanning is not matched with the feeding speed of the sheet of paper, an elongated image may be obtained through the image scanning.

Figure 12:
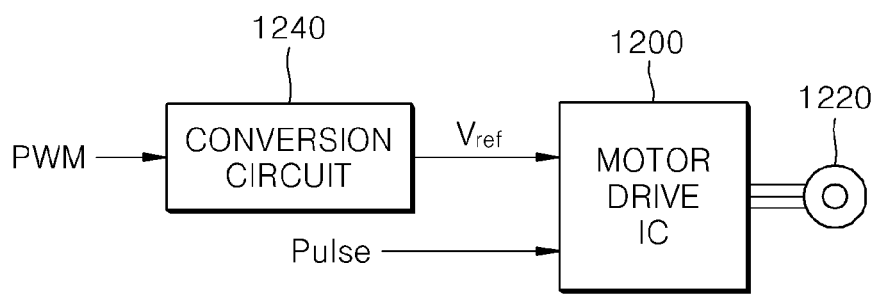
FIG. 12 is a view illustrating an exemplary circuit for controlling a motor speed and a motor current.

FIG. 12 illustrates an exemplary circuit having the functions of the motor current control unit 800 and the motor speed control unit 820. Referring to FIG. 12, a signal PWM may be converted into a voltage Vref by a conversion circuit 1240. That is, the voltage Vref may be changed by varying the signal PWM. The voltage Vref is used as an input signal to a motor drive IC 1200. That is, a current supplied to a motor 1220 may be increased or decreased by varying the signal PWM. In addition, a pulse signal used as an input signal to the motor drive IC 1200 may be adjusted to vary the speed of the motor 1220. That is, the speed of the motor 1220 may be adjusted by varying the frequency of the pulse signal. A pulse signal frequency table may be used when varying the frequency of the pulse signal.

Next, with reference to FIGS. 6 to 9, the scanner including the ADF will now be described according to one or more embodiments.

FIG. 6 is a block diagram illustrating the scanner including the ADF shown in FIG. 7. The scanner includes the scan unit 640, a scan control unit (scan controller) 630, a feed unit (feeder) 600, a feed control unit (feed controller) 610, and a retry control unit (retry controller) 620.

The scan unit 640 scans an image of a sheet of paper. The scan unit 640 includes scan rollers 940, the second sensor 950, and exit rollers 960.

The scan rollers 940 carry a picked-up and carried sheet of paper for a scanning process. The second sensor 950 is used to detect a sheet of paper carried by the scan rollers 940. If the second sensor 950 detects a sheet of paper carried by the scan rollers 940, the second sensor 950 indicates a start of image scanning. The exit rollers 960 discharge a sheet of paper 980 passing the second sensor 950.

The scan control unit 630 controls an image scanning operation of the scan unit 640.

The feed unit 600 picks up a sheet of paper and carries the sheet of paper to the scan unit 640. The feed unit 600 is the same as the feed unit 700 shown in FIG. 7 including the pickup roller (900, 910), the first sensor 920, and the feed rollers 930. The pickup roller (900, 910) picks up a sheet of paper. The first sensor 920 detects a picked up sheet of paper to determine whether the sheet of paper is normally picked up. The feed rollers 930 carry a sheet of paper passing the first sensor 920 to the scan unit 640.

The feed control unit 610 controls the feed unit 600. The feed control unit 610 is the same as the feed control unit 720 of FIG. 7. That is, the feed control unit 610 controls the feed unit 600. Specifically, the feed control unit 610 controls the pickup roller (900, 910) so that the feed unit 600 may pick up a sheet of paper.

If a sheet of paper is not normally picked up by the feed unit 600, the retry control unit 620 decreases the speed of the motor driving the feed unit 600 or increases a current supplied to the motor for picking up the sheet of paper.

The retry control unit 620 is the same as the retry control unit 740 of FIG. 7. Whether a sheet of paper is normally picked up may be determined based on whether the first sensor 920 detects the sheet of paper. If the first sensor 920 detects a sheet of paper, it may be determined that the sheet of paper is normally picked up. If the speed of the motor is decreased and a current supplied to the motor is increased for picking up a sheet of paper, the retry control unit 620 changes the decreased speed of the motor and the increased current supplied to the motor to original values thereof after the sheet of paper is normally picked up and before the scan unit 640 scans an image of the sheet of paper. The reason for this is to match the speed of image scanning with the speed of paper feeding for appropriate image scanning. In addition, if a large current is applied to the motor, the scan unit 640 may be vibrated, and thus image scanning may be affected by the vibration. Therefore, the increased current supplied to the motor may be decreased to an original value thereof. The retry control unit 620 may only decrease the speed of the motor or increase a current supplied to the motor, or may control both the motor speed and current.

The retry control unit 620 includes the motor current control unit 800, the motor speed control unit 820, and the paper distance control unit 840. Descriptions of the motor current control unit 800, the motor speed control unit 820, and the paper distance control unit 840 will not be repeated.

The motor may include a first motor driving the feed unit 600 and a second motor driving the scan unit 640. Alternatively, the motor drives both the feed unit 600 and the scan unit 640.

Figure 16:
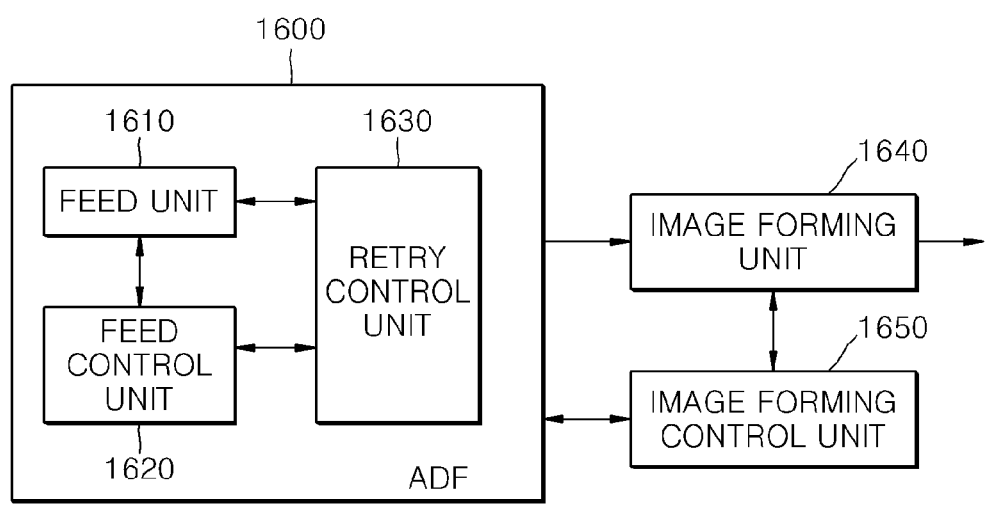
FIG. 16 is a block diagram illustrating an image forming apparatus including an ADF according to an embodiment.

FIG. 16 is a block diagram illustrating an image forming apparatus including an ADF 1600 according to one or more embodiments. The image forming apparatus includes an image forming unit (image forming apparatus) 1640, an image forming control unit (image forming controller) 1650, a feed unit (feeder) 1610, a feed control unit (feed controller) 1620, and a retry control unit (retry controller) 1630.

With reference to FIGS. 7, 8, and 16, the image forming apparatus including the ADF 1600 will now be described according to one or more embodiments.

The image forming unit 1640 is used to form images on sheets of paper. The image forming control unit 1650 controls an image forming operation of the image forming unit 1640.

The feed unit 1610 picks up a sheet of paper by using the pickup roller (900, 910) and carries the sheet of paper to the image forming unit 1640 by using the feed rollers 930. The feed control unit 1620 controls the feed unit 1610.

If a sheet of paper is not normally picked up by the feed unit 1610, the retry control unit 1630 decreases the speed of a motor driving the feed unit 1610 or increases a current supplied to the motor for picking up the sheet of paper.

The retry control unit 1630 has the same functions as the functions of the retry control unit 740 shown in FIG. 7. If a sheet of paper is not normally picked up by the feed unit 1610, the retry control unit 1630 decreases the speed of the motor driving the feed unit 1610 or increases a current supplied to the motor for picking up the sheet of paper. Whether a sheet of paper is normally picked up may be determined based on whether the first sensor 920 detects the sheet of paper. If the first sensor 920 detects a sheet of paper, it may be determined that the sheet of paper is normally picked up. If the speed of the motor is decreased and a current supplied to the motor is increased for picking up a sheet of paper, the retry control unit 1630 changes the decreased speed of the motor and the increased current supplied to the motor to original values thereof after the sheet of paper is normally picked up and before the image forming unit 1640 forms an image on the sheet of paper. The reason for this is to match the speed of image forming with the speed of paper feeding for appropriate image forming. In addition, if a large current is applied to the motor, the image forming unit 1640 may be vibrated, and thus image forming may be affected by the vibration. Therefore, the increased current supplied to the motor may be decreased to an original value thereof. The retry control unit 1630 may only decrease the speed of the motor or increase a current supplied to the motor, or may control both the motor speed and current.

The retry control unit 1630 includes the motor current control unit 800, the motor speed control unit 820, and the paper distance control unit 840. The motor current control unit 800 varies a current supplied to the motor driving the feed unit 1610. If a sheet of paper is not normally picked up by the feed unit 1610, the motor current control unit 800 increases a current supplied to the motor. The motor speed control unit 820 maintains or varies the speed of the motor, and if a sheet of paper is not normally picked up by the feed unit 1610, the motor speed control unit 820 decreases the speed of the motor. A paper distance may be defined as a distance between the first sensor 920 indicating whether a sheet of paper is normally picked up and the second sensor 950 indicating a start of image forming, and if a sheet of paper is within the paper distance, the paper distance control unit 840 may decrease a current increased and supplied to the motor to an original value thereof and may increase a decreased speed of the motor to an original value. The image forming apparatus may be an office machine including an ADF, such as a printer, a copy machine, a multi-function apparatus, and a fax machine.

Figure 13:
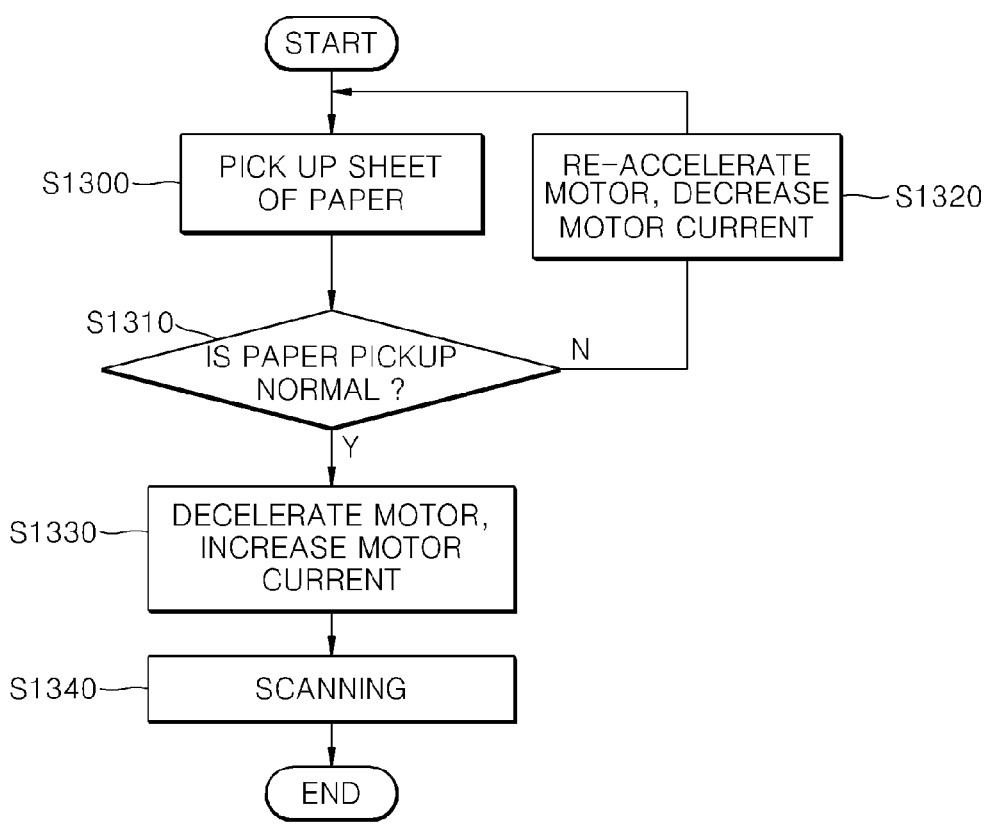
FIG. 13 is a flowchart illustrating a method of controlling paper feeding in an ADF according to an embodiment.

FIG. 13 is a flowchart illustrating a method of controlling paper feeding in an ADF according to an embodiment.

With reference to FIGS. 6 to 9 and 13, the method of controlling paper feeding in an ADF will now be described according to one or more embodiments.

First, the feed unit 600 picks up a sheet of paper (operation S1300). It is checked whether the sheet of paper is normally picked up (operation S1310). Whether the sheet of paper is normally picked up may be determined based on whether the sheet of paper is detected by the first sensor 920.

If it is determined that the sheet of paper is not normally picked up, the motor driving the feed unit 600 is decelerated or a current to the motor is increased (operation S1320), and the sheet of paper is picked up again.

Then, it is checked again whether the sheet of paper is normally picked up (operation S1310). If it is determined that the sheet of paper is normally picked up, the increased current to the motor and the speed of the motor are changed to original values thereof (operation S1330), and the scan unit 640 start scanning (operation S1340). That is, in the paper feeding controlling method of the current embodiment, a paper distance may be defined as a distance between the first sensor 920 indicating whether a sheet of paper is normally picked up and the second sensor 950 indicating a start of image forming, and if a sheet of paper is within the paper distance, a current increased and supplied to the motor and a decreased speed of the motor may be changed to original values thereof, and then scanning may be performed.

If the sheet of paper is not normally picked up, operations S1300 and S1310 may be performed, and if the operations S1300 and S1310 are repeated more than a preset number of times, operation S1320 may be performed. In addition, if the sheet of paper is not normally picked up, operation S1320 may be repeated, and if operation S1310 is repeated more than a preset number of times, a paper feed error may be displayed.

Figure 14:
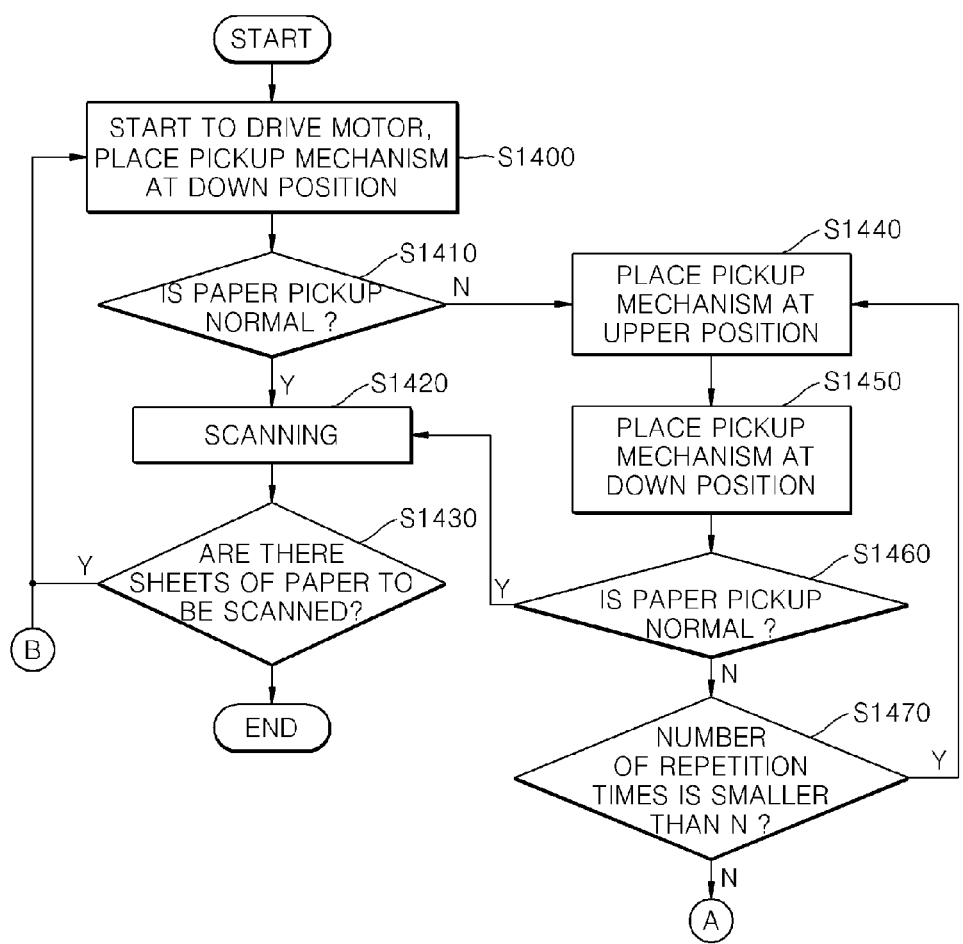
FIGS. 14 and 15 are flowcharts illustrating methods of controlling paper feeding in an ADF according to one or more embodiments.
Figure 15:
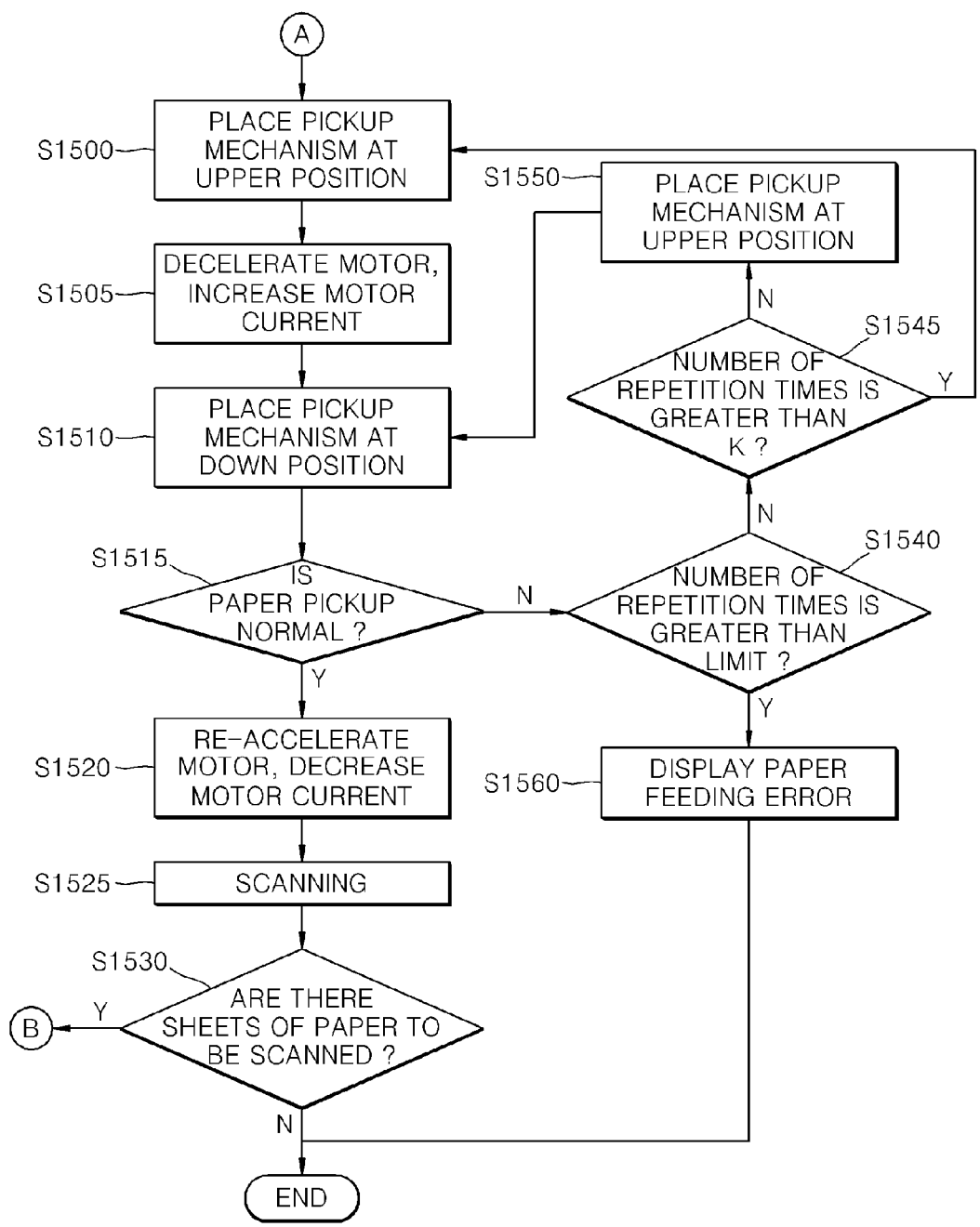

FIGS. 14 and 15 are flowcharts illustrating methods of controlling paper feeding in an ADF according to one or more embodiments.

Referring to FIGS. 14 and 15, if the ADF is operated, a motor drives a pickup mechanism to a down position (refer to a position 900 shown in FIG. 9) (operation S1400). Then, it is checked whether a sheet of paper is normally picked up by detecting the sheet of paper using a sensor such as the sensor 920 shown in FIG. 1 (operation S1410).

If it is determined that the sheet of paper is normally detected, a scan control unit such as the scan control unit 630 shown in FIG. 9 is operated to scan an image (operation S1420). However, if it is determined that the sheet of paper is not normally picked up based on a detection result of the sensor 920, the pickup mechanism is placed at an upper position (operation S1440), and is then placed at the down position to pick up the sheet of paper (operation S1450). Thereafter, it is checked whether the sheet of paper is normally picked up by using the sensor 920 (operation S1460). If it is determined that the sheet of paper is normally detected, the scan control unit 630 is operated to scan an image (operation S1420). If the sheet of paper is not normally picked up, operations S1440 to S1470 are performed a preset maximum number of times N.

If the sheet of paper is not normally picked up although operations S1440 to 1470 are repeated the preset maximum number of times N, the pickup mechanism is placed at the upper position (refer to a position 910 shown in FIG. 9) (operation S1500). Then, a retry control unit such as the retry control unit 620 or 740 decreases the speed of a motor driving a feed unit such as the feed unit 600 or 700 or increases a current supplied to the motor so as to increase the torque of the motor for picking up the sheet of paper using a large force (operation S1505). Thereafter, the pickup mechanism is placed to the down position (refer to the position 900 shown in FIG. 9) (operation S1510). At this time, both the speed and current of the motor may be controlled. That is, the speed of the motor may be decreased and the current supplied to the motor may be increased.

Thereafter, it is checked whether the sheet of paper is normally picked up by using the first sensor 920 (operation S1515). If the sheet of paper is normally picked up and thus the first sensor 920 is turned on, the retry control unit 620 or 740 accelerates the motor to a speed suitable for scanning an image and decreases the current supplied to the motor before the second sensor 950 is turned on (operation S1520). Then, the scan unit 640 scans an image of the sheet of paper (operation S1525). Thereafter, it is checked whether there remain sheets of paper to be scanned (operation S1530), and if it is determined that there remains no sheet of paper to be scanned, the paper feeding by the ADF is stopped. If there remain sheets of paper to be scanned, the method proceeds to operation S1400 to operate the motor for moving the pickup mechanism to the down position 900.

If it is determined that the sheet of paper is not normally picked up in operation S1515, the method proceeds to operation S1540 to check whether the number of repetition times is greater than a preset limit. If it is determine that the number of repetition times is greater than the preset limit, a paper feed error is displayed (operation S1560), and the method ends. However, if it is determined that the number of repetition times is not greater than the preset limit, the method proceeds to operation S1545 to check whether the number of repetition times is greater than a preset value K. If the number of repetition times is greater than the preset value K, the method proceeds to operation S1500 to place the pickup mechanism to the upper position 910. If the number of repetition times is not greater than the preset value K, the method proceeds to operation S1550 to place the pickup mechanism to the upper position 910 and then to operation S1510 to place the pickup mechanism to the down position 900.

Meanwhile, if it is determined that the sheet of paper is normally picked in operation S1410, the scan unit 640 performs scanning (operation S1420), and it is checked whether there remain sheets of paper to be scanned (operation S1430). If there remain sheets of paper to be scanned, the method proceeds to operation S1400 for scanning the remaining sheets of paper. If there remains no sheet of paper to be scanned, the method ends.

Figure 11A:
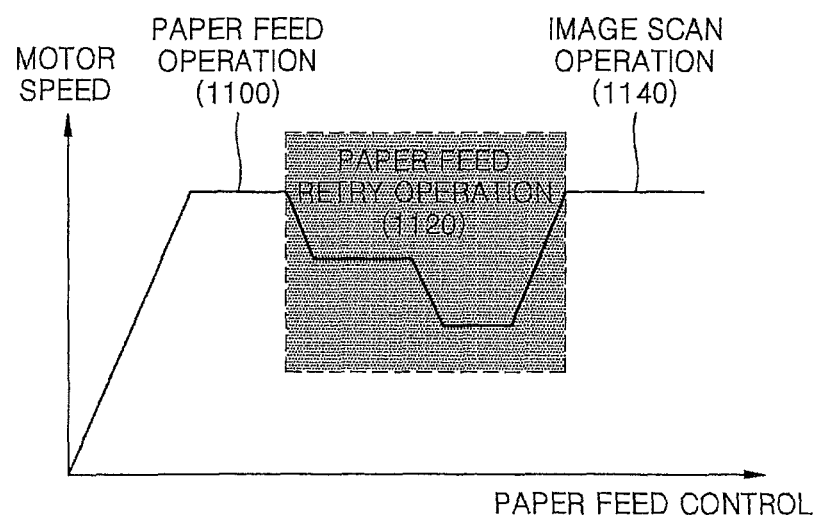
FIGS. 11A and 11B are a graph illustrating an exemplary relationship between the speed of a motor and a paper feed operation, and a graph illustrating an exemplary relationship between a current supplied to the motor and a paper feed operation.

FIG. 11A is a graph showing a motor speed control curve for the case in which a sheet of paper is normally picked up after a retry control unit decreases the speed of a motor two times (1120) because the number of retry repetition times of paper feeding exceeds a maximum value two times. That is, if a paper feed operation 1100 (paper pickup operation) is not normally performed, a paper feed retry operation is performed. At this time, the speed of the motor is decreased, and since a sheet of paper is not yet normally picked up although the speed of the motor is decreased, the speed of the motor is decreased again.

Figure 11B:
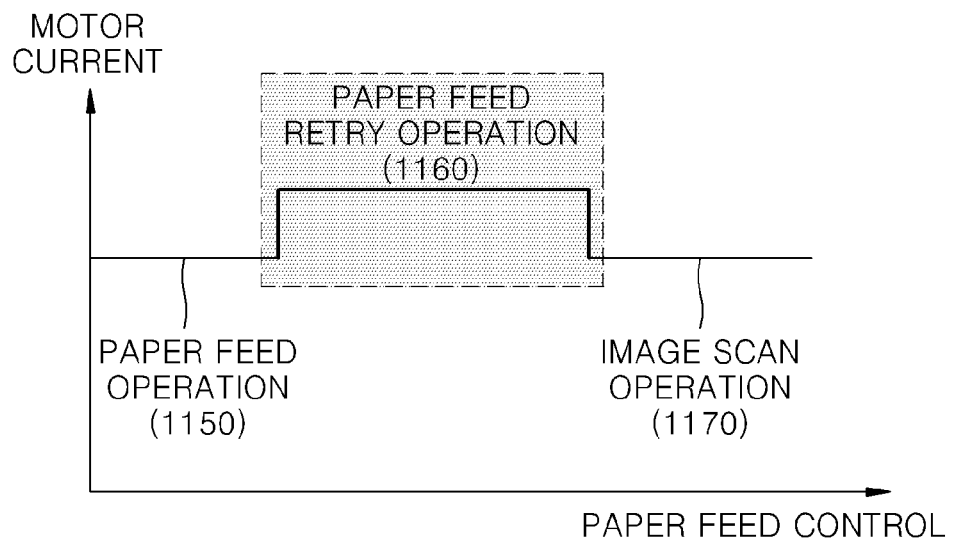

At this time, as shown in FIG. 11B, a paper feed operation 1150 is performed, and if a sheet of paper is not normally picked up, a paper feed retry operation is performed after increasing a current supplied to the motor (1160). The increased current is decreased to an original value before an image scanning operation 1170 is performed.

As described above, according to the ADF, the method of controlling the ADF, and the scanner including the ADF of one or more embodiments, although sheets of paper are not normally fed when a user intends to use various kinds of sheets of paper with the ADF, the retry control unit may stabilize feeding of the feeding of the sheets of paper. Thus, efficient, convenient, and high-quality paper feeding may be possible.

It should be understood that the exemplary embodiments described therein should be considered in a descriptive sense only and not for purposes of limitation. Descriptions of features or aspects within each embodiment should typically be considered as available for other similar features or aspects in other embodiments.

While embodiments have been described with reference to the figures, it will be understood by those of ordinary skill in the art that various changes in form and details may be made therein without departing from the spirit and scope of the present disclosure as defined by the following claims.

What is claimed is:

1. An ADF (auto document feeder) comprising:
a feeder configured to pick up a sheet of paper and carry the sheet of paper to a scanner;
a feed controller configured to control the feeder; and
a retry controller, wherein if the sheet of paper is not normally picked up by the feeder, the retry controller decreases a speed of a motor driving the feeder and increases a current supplied to the motor for picking up the sheet of paper,
wherein the feeder includes a first sensor and the scanner includes a second sensor, and
wherein if the sheet of paper is within a paper distance defined from the first sensor indicating whether the sheet of paper is normally picked up to the second sensor indicating a start of image scanning, the retry controller reduces the increased current supplied to the motor to a first original value and increases the decreased speed of the motor to a second original value.

2. The ADF of claim 1, wherein:
the feeder further comprises:
a pickup roller configured to pick up the sheet of paper, and
a feed roller configured to carry the sheet of paper passing the first sensor to the scanner; and
the first sensor indicates whether the sheet of paper is normally picked up.

3. An ADF (auto document feeder) comprising:
a feeder configured to pick up a sheet of paper and carry the sheet of paper to a scanner;
a feed controller configured to control the feeder; and
a retry controller, wherein if the sheet of paper is not normally picked up by the feeder, the retry controller decreases a speed of a motor driving the feeder and increases a current supplied to the motor for picking up the sheet of paper,
wherein the retry controller comprises:
a motor current controller configured to vary the current supplied to the motor driving the feeder, wherein if the sheet of paper is not normally picked up by the feeder, the motor current controller increases the current supplied to the motor;
a motor speed controller configured to maintain or vary the speed of the motor, wherein if the sheet of paper is not normally picked up by the feeder, the motor speed controller decreases the speed of the motor; and
a paper distance controller, wherein a paper distance is defined as a distance between a first sensor indicating whether the sheet of paper is normally picked up and a second sensor indicating a start of image scanning, and wherein if the sheet of paper is within the paper distance, the paper distance controller reduces the current increased and supplied to the motor to a first original value and increases the decreased speed of the motor to a second original value.

4. The ADF of claim 3, wherein the paper distance controller reduces the current increased and supplied to the motor to the first original value and increases the decreased speed of the motor to the second original value before the scanner scans the image of the sheet of paper.

5. A scanning apparatus comprising:
a scanner configured to scan an image of a sheet of paper;
a scan controller configured to control an image scanning operation of the scanner;
a feeder configured to pick up the sheet of paper and carry the sheet of paper to the scanner;
a feed controller configured to control the feeder; and
a retry controller, wherein if the sheet of paper is not normally picked up by the feeder, the retry controller decreases a speed of a motor driving the feeder and increases a current supplied to the motor for picking up the sheet of paper,
wherein the feeder includes a first sensor and the scanner includes a second sensor, and
wherein if the sheet of paper is within a paper distance defined from the first sensor indicating whether the sheet of paper is normally picked up to the second sensor indicating a start of image scanning, the retry controller reduces the increased current supplied to the motor to a first original value and increases the decreased speed of the motor to a second original value.

6. The scanning apparatus of claim 5, wherein:
the feeder further comprises:
a pickup roller configured to pick up the sheet of paper, and
a feed roller configured to carry the sheet of paper passing the first sensor to the scanner; and
the first sensor indicates whether the sheet of paper is normally picked up.

7. The scanning apparatus of claim 5, wherein:
the scanner comprises:
a scan roller configured to carry picked-up sheet of paper for a scanning process, and
an exit roller configured to discharge the sheet of paper passing the second sensor; and
the second sensor is configured to detect the sheet of paper carried by the scan roller and to indicate a start of image scanning upon detection of the sheet of paper.

8. The scanning apparatus of claim 5, wherein the motor comprises:
a first motor configured to drive the feeder; and
a second motor configured to drive the scanner.

9. A scanning apparatus comprising:
a scanner configured to scan an image of a sheet of paper;
a scan controller configured to control an image scanning operation of the scanner;
a feeder configured to pick up the sheet of paper and carry the sheet of paper to the scanner;
a feed controller configured to control the feeder; and
a retry controller, wherein if the sheet of paper is not normally picked up by the feeder, the retry controller decreases a speed of a motor driving the feeder-e-r and increases a current supplied to the motor for picking up the sheet of paper,
wherein the retry controller comprises:
a motor current controller configured to vary the current supplied to the motor driving the feeder, wherein if the sheet of paper is not normally picked up by the feeder, the motor current controller increases the current supplied to the motor;
a motor speed controller configured to maintain or vary the speed of the motor, wherein if the sheet of paper is not normally picked up by the feeder, the motor speed controller decreases the speed of the motor; and
a paper distance controller, wherein a paper distance is a distance between a first sensor indicating whether the sheet of paper is normally picked up and a second sensor indicating a start of image scanning, and if the sheet of paper is within the paper distance, the paper distance controller reduces the current increased and supplied to the motor to a first original value and increases the decreased speed of the motor to a second original value.

10. The scanning apparatus of claim 9, wherein the paper distance controller reduces the current increased and supplied to the motor to the first original value and increases the decreased speed of the motor to the second original value before the scanner scans the image of the sheet of paper.

11. An image forming apparatus comprising:
an image forming unit configured to form an image on a sheet of paper;
an image forming controller configured to control an image forming operation of the image forming unit;
a feeder configured to pick up the sheet of paper and carry the sheet of paper to the image forming unit by way of a scanner;
a feed controller configured to control the feeder; and
a retry controller, wherein if the sheet of paper is not normally picked up by the feeder, the retry controller decreases a speed of a motor driving the feeder and increases a current supplied to the motor for picking up the sheet of paper,
wherein the feeder includes a first sensor and the scanner includes a second sensor, and
wherein if the sheet of paper is within a paper distance defined from the first sensor indicating whether the sheet of paper is normally picked up to the second sensor indicating a start of image scanning, the retry controller reduces the increased current supplied to the motor to a first original value and increases the decreased speed of the motor to a second original value.

12. An image forming apparatus comprising:
an image forming unit configured to form an image on a sheet of paper;
an image forming controller configured to control an image forming operation of the image forming unit;
a feeder configured to pick up the sheet of paper and carry the sheet of paper to the image forming unit;
a feed controller configured to control the feeder; and
a retry controller, wherein if the sheet of paper is not normally picked up by the feeder, the retry controller decreases a speed of a motor driving the feeder and increases a current supplied to the motor for picking up the sheet of paper,
wherein the retry controller comprises:
a motor current controller configured to vary the current supplied to the motor driving the feeder, wherein if the sheet of paper is not normally picked up by the feeder, the motor current controller increases the current supplied to the motor;
a motor speed controller configured to maintain or vary the speed of the motor, wherein if the sheet of paper is not normally picked up by the feeder, the motor speed controller decreases the speed of the motor; and
a paper distance controller, wherein a paper distance is a distance between a first sensor indicating whether the sheet of paper is normally picked up and a second sensor indicating a start of image scanning, and if the sheet of paper is within the paper distance, the paper distance controller reduces the current increased and supplied to the motor to a first original value and increases the decreased speed of the motor to a second original value.

13. The image forming apparatus of claim 12, wherein the paper distance controller reduces the current increased and supplied to the motor to the first original value and increases the decreased speed of the motor to the second original value before the scanner scans the image of the sheet of paper.

14. A method of controlling paper feeding in an automatic document feeder (ADF), the method comprising:
   picking up a sheet of paper;
   checking whether the sheet of paper is normally picked up; and
   if the sheet of paper is not normally picked up, retrying to pick up the sheet of paper by decreasing a speed of a motor driving a feeder and increasing a current supplied to the motor,
   wherein if the sheet of paper is within a paper distance defined from a first sensor indicating whether the sheet of paper is normally picked up to a second sensor indicating a start of image scanning, the method further comprises reducing the increased current supplied to the motor to a first original value and increasing the decreased speed of the motor to a second original value.

15. The method of claim 14, wherein the reducing the increased current supplied to the motor to a first original value and the increasing the decreased speed of the motor to a second original value are performed before the start of image scanning.

16. A method of controlling paper feeding in an automatic document feeder (ADF), the method comprising:
   picking up a sheet of paper;
   checking whether the sheet of paper is normally picked up; and
   if the sheet of paper is not normally picked up, retrying to pick up the sheet of paper by decreasing a speed of a motor driving a feeder and increasing a current supplied to the motor,
   wherein if the sheet of paper is not normally picked up, the picking up and the checking are performed, and wherein if the picking up and the checking are performed more than a preset number of times, the retrying is performed.

17. The method of claim 16, wherein if the sheet of paper is not normally picked up, the retrying is repeated, and wherein if the retrying is performed more than a preset number of times, a paper feed error is displayed.

18. An ADF (auto document feeder) comprising:
   a feeder configured to pick up a sheet of a medium and carry the sheet to a scanner; and
   a retry controller, wherein if the sheet is not normally picked up by the feeder, the retry controller decreases a speed of a motor driving the feeder and increases a current supplied to the motor for picking up the sheet,
   wherein the feeder includes a first sensor and the scanner includes a second sensor, and
   wherein if the sheet of paper is within a paper distance defined from the first sensor indicating whether the sheet of paper is normally picked up to the second sensor indicating a start of image scanning, the retry controller reduces the increased current supplied to the motor to a first original value and increases the decreased speed of the motor to a second original value.

19. An ADF (auto document feeder) comprising:
   a feeder configured to pick up a sheet of a medium and carry the sheet to a scanner; and
   a retry controller, wherein if the sheet is not normally picked up by the feeder, the retry controller decreases a speed of a motor driving the feeder and increases a current supplied to the motor for picking up the sheet,
   wherein the retry controller comprises a medium distance controller, wherein a medium distance is defined as a distance between a first sensor indicating whether the sheet is normally picked up and a second sensor indicating a start of image scanning, and wherein if the sheet is within the medium distance, the medium distance controller reduces the current increased and supplied to the motor to a first original value and increases the decreased speed of the motor to a second original value.

20. The ADF of claim 19, wherein the medium distance controller reduces the increased current supplied to the motor to a first original value and increases the decreased speed of the motor to a second original value before the start of image scanning.

* * * * *